(12) United States Patent
Melin

(10) Patent No.: US 6,655,833 B1
(45) Date of Patent: Dec. 2, 2003

(54) ARRANGEMENT FOR CALCULATING THE TEMPERATURE IN THE DRIVER'S SPACE OF A VEHICLE

(75) Inventor: Sven Anders Melin, Sodertalje (SE)

(73) Assignee: Scania CV AB (publ) (SE)

(*) Notice: Subject to any disclaimer, the term of this patent is extended or adjusted under 35 U.S.C. 154(b) by 0 days.

(21) Appl. No.: 10/111,781

(22) PCT Filed: Oct. 26, 2000

(86) PCT No.: PCT/SE00/02081
§ 371 (c)(1),
(2), (4) Date: Apr. 26, 2002

(87) PCT Pub. No.: WO01/30597
PCT Pub. Date: May 3, 2001

(30) Foreign Application Priority Data
Oct. 29, 1999 (SE) ................................ 9903900

(51) Int. Cl.$^7$ ........................ G01K 13/00; G01K 1/14
(52) U.S. Cl. .................. 374/147; 374/148; 374/141
(58) Field of Search ................. 374/147, 141, 374/148, 100

(56) References Cited

U.S. PATENT DOCUMENTS

| | | | | |
|---|---|---|---|---|
| 3,656,541 A | * | 4/1972 | Coyle et al. | 165/16 |
| 4,516,106 A | * | 5/1985 | Nolting et al. | 338/28 |
| 5,003,785 A | * | 4/1991 | Petri et al. | 62/131 |
| 5,392,845 A | * | 2/1995 | Honda et al. | 165/12 |
| 5,400,964 A | * | 3/1995 | Freiberger | 236/91 |
| 5,518,065 A | * | 5/1996 | Asou et al. | 165/43 |

FOREIGN PATENT DOCUMENTS

| | | | |
|---|---|---|---|
| DE | 3510648 | 9/1986 | |
| DE | 3722000 | 1/1989 | |
| DE | 4142648 | 4/1993 | |
| DE | 10002217 A1 | * 8/2001 | B60H/1/00 |
| EP | 0796751 | 9/1997 | |

* cited by examiner

Primary Examiner—Diego Gutierrez
Assistant Examiner—Mirellys Jagan
(74) Attorney, Agent, or Firm—Ostrolenk, Faber, Gerb & Soffen, LLP

(57) ABSTRACT

The present invention relates to an arrangement (1) for calculating the temperature T in a driver's compartment (2) of a vehicle. The arrangement (1) incorporates a temperature sensor (4) arranged in a duct (5) and means (6) designed to allow an air flow from said driver's compartment (2) to pass through said duct (5), and said temperature sensor (4) is designed to measure a first temperature level T1 of said airflow. Said means (6) are also designed to halt said air flow for a period of time and said temperature sensor (4) is designed to measure, towards the end of said period of time, a second temperature level T2. The temperature T is calculated on the basis of said first temperature level T1 and said second temperature level T2.

20 Claims, 1 Drawing Sheet

ARRANGEMENT FOR CALCULATING THE TEMPERATURE IN THE DRIVER'S SPACE OF A VEHICLE

BACKGROUND TO THE INVENTION, AND STATE OF THE ART

The present invention relates to an arrangement for calculating the temperature in a driver's compartment of a vehicle by measuring air temperature in a duct communicating to the compartment.

Vehicles are provided with air conditioning systems for controlling the air temperature in a driver's compartment. Such systems incorporate automatic temperature control and ventilation. To measure the temperature in the driver's compartment, most air conditioning arrangements use some type of temperature sensor and the measured temperature is used as a basis for raising or lowering the temperature of the air in the driver's compartment with a view to creating an environment acceptable to the driver and any passengers.

The temperature sensor is often situated in an aperture in the vehicle's instrument panel. Being able to estimate the temperature of the air in the driver's compartment entails having in some way to cause a flow of air from the driver's compartment through said aperture so that the temperature sensor can measure the temperature of the air flow and hence estimate the temperature of the air in the driver's compartment. The air flow may be induced by using a fan to draw air in from the driver's compartment through said aperture.

However, the temperature of the instrument panel and the region around it often differs from the air temperature in the driver's compartment, resulting in risk of the air drawn into said aperture being cooled or heated by the surfaces of said panel with which the air flow comes into contact.

EP, 0 796 751, A2 describes an air conditioning arrangement for a vehicle. That arrangement includes a separate fan or ejector designed to induce an air flow from the driver's compartment through a duct in which a first temperature sensor is incorporated. The same arrangement also includes a second temperature sensor arranged in a wall device which surrounds said duct. The second temperature sensor is intended to compensate for heat transfer between said wall device and said air flow.

SUMMARY OF THE INVENTION

The object of the present invention is to provide an arrangement by which the temperature of the air in the driver's compartment can be calculated by a single temperature sensor and the heat transfer problem mentioned above is eliminated.

This object is achieved with the arrangement of the invention.

Such an arrangement which incorporates means designed both to allow an air flow from the driver's compartment to pass through a duct in which a temperature sensor is arranged and to halt said air flow for a period of time so that the air around the temperature sensor is substantially still makes it possible to effect compensation for heat transfer between the region in the vicinity of the temperature sensor and said air flow without any further temperature sensor. The temperature sensor is designed to measure a first temperature level of the air flow and a second temperature level of the substantially stationary air around the temperature sensor towards the end of said period of time. During said period of time, the temperature sensor will be heated if the region, which may for example include surfaces of panels etc., is warmer than the air in the driver's compartment, and the temperature sensor will be cooled if the region is cooler than the air in the driver's compartment. These two temperature levels can thus be used easily and accurately to calculate the temperature in the driver's compartment.

According to one embodiment of the invention, the arrangement incorporates a computing unit designed to calculate the temperature difference between said second temperature level and said first temperature level, said temperature difference then constituting a compensation factor for calculating the temperature of the air in the driver's compartment. Said temperature difference corresponds to a temperature rise or fall during the period of cessation of the air flow.

According to a further embodiment of the invention, said duct is defined by wall devices whose temperature differs from that of the driver's compartment and a heat transfer takes place between said wall devices and said air flow, so said compensation factor is intended to compensate for said heat transfer.

According to a further embodiment of the invention, said period of time is about 1–40 seconds, e.g. 5–20 seconds. The factors on which the period of time depends include the dimensions of said duct, the type of temperature sensor and its positioning in said duct.

According to a further embodiment of the invention, said means include a fan. It should be noted that said fan might take the form of an existing fan of the vehicle which is thus intended to allow an air flow from said driver's compartment through said duct. As said fan is intended also to control other functions of the vehicle, problems might arise if the fan was also intended to halt the air flow, i.e. to be switched off during a period of time. Accordingly, said means might also include some type of valve intended to halt said air flow through the duct for said period of time. It should be noted that said air flow may be created in many different ways, e.g. said duct might be arranged in such a way as to cause an air flow from the driver's compartment through said duct by natural draught. Said means might thus include one or more fans arranged adjacent to said duct and intended to be switched off for said period of time. Said air flow may also be provided by means of a pump device. According to a preferred embodiment of the invention, however, said means include a separate fan which is intended both to assume an active state in which said first temperature level is measured and to assume an inactive passive state in which the fan is switched off and said second temperature level is measured.

According to a further embodiment of the invention, said duct is arranged in a wall element of the vehicle. Said wall element may consist of the instrument panel, in which case said temperature difference constitutes a compensation factor for the heat transfer which takes place between the air flow and the surfaces of the instrument panel with which the air flow comes into contact.

According to a further embodiment, said temperature sensor is connected via said computing unit to an air conditioning system of the vehicle. The temperature calculated by the computing unit may thus be used as a basis for raising or lowering the temperature of the air in the driver's compartment with the object of creating an environment acceptable to the driver and any passengers.

BRIEF DESCRIPTION OF THE DRAWING

The present invention will now be explained by describing a preferred embodiment with reference to the attached drawing.

DETAILED DESCRIPTION OF AN EMBODIMENT OF THE INVENTION

Figure 1:
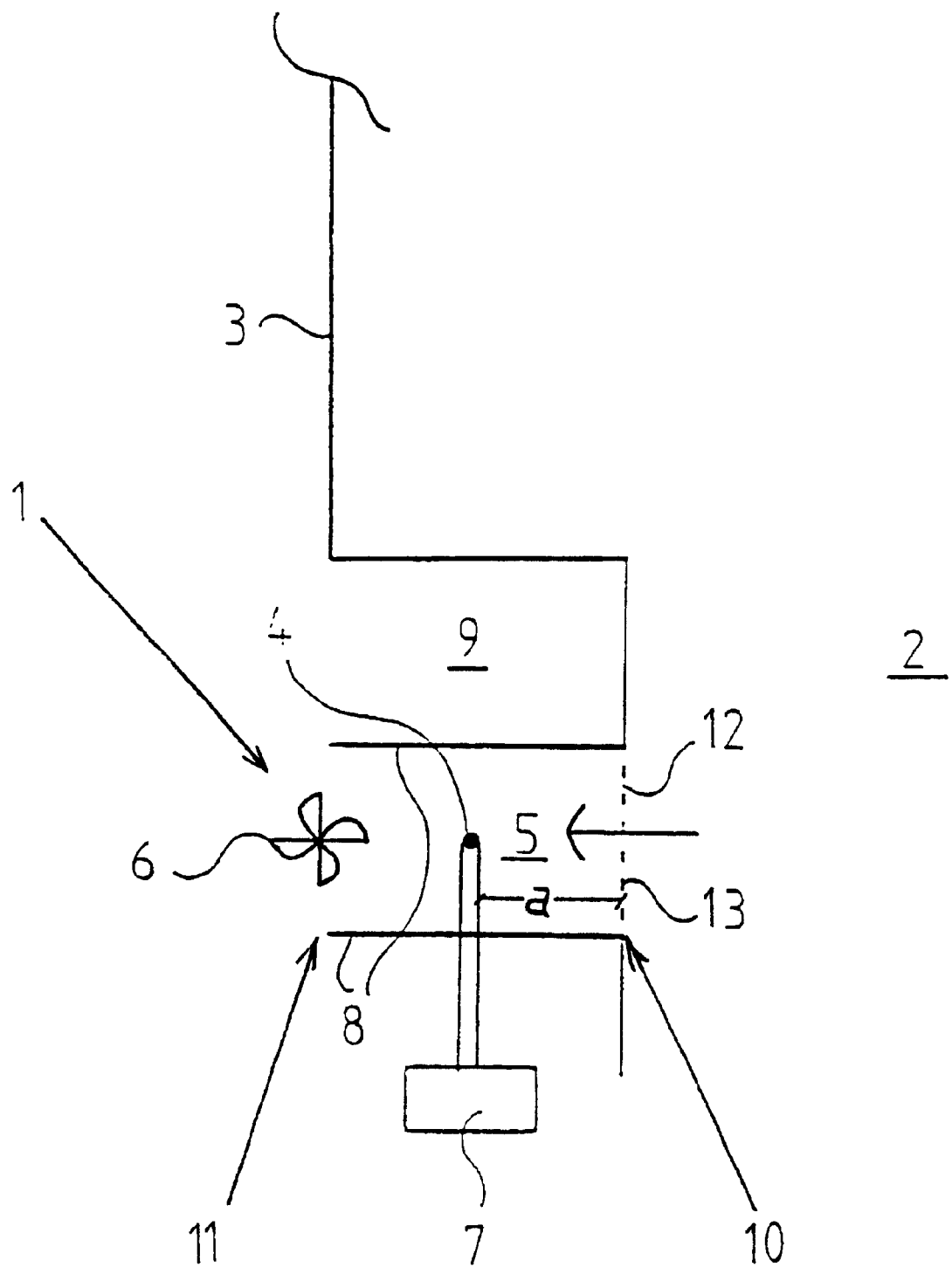
FIG. 1 depicts schematically a cross-sectional view of a preferred arrangement according to the invention applied in a driver's cab which is only partly depicted.

FIG. 1 depicts an arrangement 1 for calculating the temperature T in a space 2 surrounded by cab walls 3 (partly depicted) of a heavy vehicle such as a truck. The arrangement 1 is designed to cooperate with an air conditioning arrangement (not depicted) of the truck in order to raise or lower the temperature in the space 2, i.e. the space which accommodates a driver and any passengers, on the basis of the calculated 31 temperature T. The space 2 will hereinafter be called the cab. Although the arrangement 1 in FIG. 1 is applied in a truck cab 2, it should be noted that the invention is also applicable to other types of vehicle, e.g. in the passenger compartment of a private car.

The arrangement 1 incorporates a temperature sensor 4 which is arranged in a duct 5, and a fan 6. It also incorporates a computing unit 7. The functions of the temperature sensor 4, the fan 6 and the computing unit 7 will be described in more detail below.

Wall devices 8 surround and define the duct 5. The wall devices 8 also constitute an integral part of an instrument panel 9 of the cab 2. The duct 5 has a first end 10 and a second end 11, and an aperture 12 in the instrument panel 9 constitutes the first end 10 of the duct 5. A gridlike structure 13 is arranged at the first end 10 of the duct 5. The temperature sensor 4 is arranged at a distance a from the first end 10 of the duct 5. The fan 6 is arranged adjacent to the second end 11 of the duct 5. The fan drive (not depicted) may be effected in various ways, e.g. electrically. It should be noted that said duct 5 might be situated at other locations in the cab 2 than in the instrument panel 9.

A working operation of the arrangement 1 will now be described. There prevails in the cab 2 a temperature T which it is desired to calculate by means of the arrangement 1, and the fan 6 is designed, when in an active state, to draw in air, i.e. to induce an air flow (the air flow is indicated by an arrow in FIG. 1) from the cab 2 through the aperture 12 in the instrument panel 9 and the duct 5. The temperature sensor 4 is designed to measure a first temperature level T1 of the air flow. The temperature T1 is transmitted to and stored in the computing unit 7 which incorporates a computer. The temperature of the wall devices 8 which define the duct 5 in which the temperature sensor is arranged may differ from the temperature T in the cab 2. This means that the air flow may be cooled or heated by the surfaces of the wall devices 8 with which the air flow comes into contact before the first temperature level T1 is measured, resulting in the measured first temperature level not corresponding to the temperature T in the cab 2. It should be noted that the surfaces of the grid structure 13 which come into contact with the air flow when the air flow passes through the duct 5 may affect the first temperature level T1. To compensate for the respective heat transfers between the surfaces of the wall devices 8 and the gridlike structure 13 and the air flow, the fan 6 is designed to assume an inactive passive state for a certain period of time, i.e. the fan 6 is switched off for a certain time, during which the air around the temperature sensor is substantially still. The time during which the fan 6 is switched off may vary and depends inter alia on the dimensions of the duct 5, which are defined by the wall devices 8, on the distance a, i.e. the location of the temperature sensor 4 in the duct 5, on what material the instrument panel 9 consists of and on the type of temperature sensor 4. The wall devices 8 may be arranged so as to define a duct 5 with circular cross-section, the diameter of which may be around 10 to 20 mm, preferably between 10 and 20 mm. The duct 5 may also have a different cross-section, e.g. rectangular or square. The distance a may be about 10 to 30 mm. The time during which the fan 6 is switched off may be around 1 to 40 seconds, preferably 5 to 20 seconds. If the wall devices 8 are warmer than the air in the cab 2, the air around the temperature sensor will be heated during the period when the fan 6 is at standstill, and if the wall devices 8 are cooler than the air in the cab 2 the air around the temperature sensor 4 will be cooled during the period when the fan 6 is at standstill. Towards the end of the period of time during which the fan is at standstill, the temperature sensor 4 is designed to measure a second temperature level T2 which is transmitted to and stored in the computing unit 7. The computing unit 7 is designed to calculate the temperature difference $\Delta T$ between the second temperature level T2 and the first temperature level T1, which temperature difference $\Delta T$ corresponds to the temperature increase or decrease which takes place while the fan 6 is at standstill. A positive difference corresponds to a temperature increase and a negative difference to a temperature decrease. This temperature $\Delta T$ is used as compensation factor for calculating the temperature T in the cab 2.

The invention is not limited to the embodiment referred to but may be varied and modified within the scopes of the ensuing patent claims.

What is claimed is:

1. A temperature calculating arrangement for a compartment, comprising:

a compartment having a wall with a duct in the wall;

a temperature sensor in the duct and spaced from the wall for sensing the temperature of air in the duct;

an air flow device with a first operating state for flowing air from the compartment through the duct past the sensor and a second state not causing air flow through the duct from the compartment;

a temperature measuring and comparison device connected with the temperature sensor for measuring the temperature in the duct in the first and second states of the air flow device, for comparing the measured temperatures in the first and second states and calculating the temperature in the compartment based on the first and second measured temperatures.

2. The arrangement of claim 1, wherein the measuring device comprises a computing unit including means for calculating the temperature difference between the first and second measured temperatures and for using the difference as a compensation factor for calculating the temperature in the compartment.

3. The arrangement of claim 1, wherein the duct has a longitude direction of extension and has a dimension transverse to the longitudinal direction of about 10–15 mm.

4. The arrangement of claim 1, wherein the compartment comprises a driver's compartment of a vehicle.

5. The arrangement of claim 4, wherein the duct comprises a wall element in the vehicle compartment.

6. The arrangement of claim 1, wherein the air flow device comprises a fan at the duct having the first operating state for moving air through the duct.

7. The arrangement of claim 6, wherein the fan has the second state in which the fan is inactive and not moving air through the duct and the temperature measuring device is operative for measuring the temperature at the temperature sensor when the fan is in the second state.

8. The arrangement of claim 6, wherein the temperature measuring device is operative for measuring the temperature at the sensor while the fan is in the first state moving air through the duct.

9. The arrangement of claim 8, wherein the fan has the second state in which the fan is inactive and not moving air through the duct and the temperature measuring device is operative for measuring the temperature at the temperature sensor when the fan is in the second state.

10. The arrangement of claim 1, wherein the air flow device is operable for halting an air flow through the duct for a period of time and the temperature sensor is operated by the measuring device to measure the temperature in the second state toward the end of the period of time of halting the air flow.

11. The arrangement of claim 10, wherein the period of time is in the range of 5–20 seconds.

12. The arrangement of claim 10, wherein the period of time is in the range of 1–40 seconds.

13. The arrangement of claim 12, further comprising an air-conditioning system connected with the computing unit and operated by the computing unit depending upon the calculated air temperature in the compartment for operating the air-conditioning system to adjust the air temperature in the compartment.

14. The arrangement of claim 13, wherein the compartment comprises a driver's compartment of a vehicle.

15. A method for calculating the temperature in a compartment, wherein the compartment has a wall, a duct through the wall, and a temperature sensor in the duct, the method comprising:

in a first state, moving air out of the compartment and through the duct and measuring the temperature of the air flowing through the duct;

in a second state, halting the air flow and measuring the temperature of the halted air in the duct;

calculating the temperature in the compartment by comparing the first and second temperatures measured in the first and second states.

16. The method of claim 15, further comprising operating a fan for moving air through the duct in the first state.

17. The method of claim 15, wherein in the second state, air flow is halted for a period of time and the temperature of the halted air in the duct is measured toward the end of a period of time.

18. The method of claim 17, wherein the period of time is about 1–40 seconds.

19. The method of claim 15, further comprising calculating the temperature difference between the temperatures measured in the first and second states and providing the temperature difference as a compensation factor for calculating the temperature of the compartment.

20. The method of claim 19, wherein the duct is defined by a wall which may be at a different temperature from the temperature in the compartment, which would enable a heat transfer between the wall and the air in the duct, the method further comprising using the compensation factor to compensate for the heat transfer between the air and the duct and the wall.

* * * * *